June 29, 1943.  W. S. ENDERICH ET AL  2,322,795
APPARATUS FOR FORMING BEARINGS
Filed March 2, 1942  5 Sheets-Sheet 1
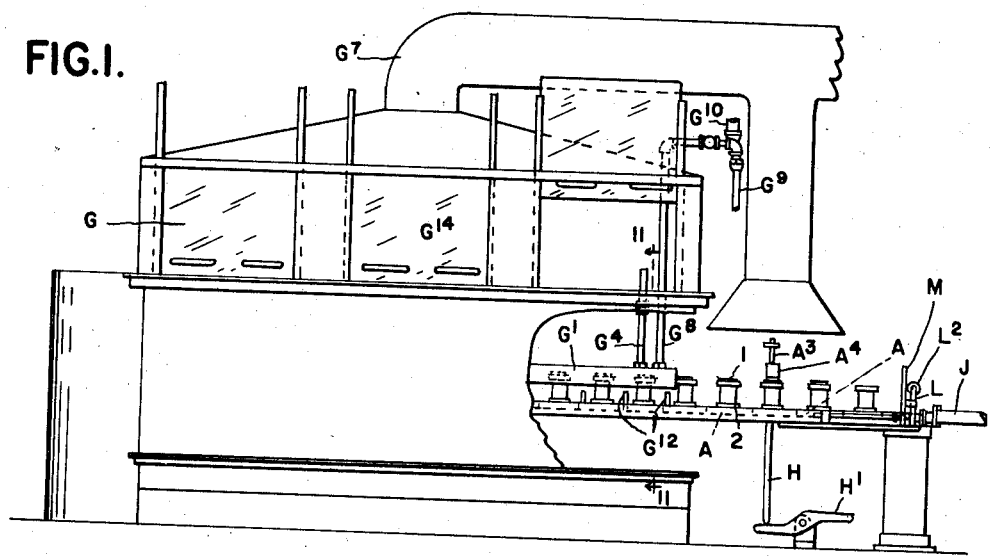
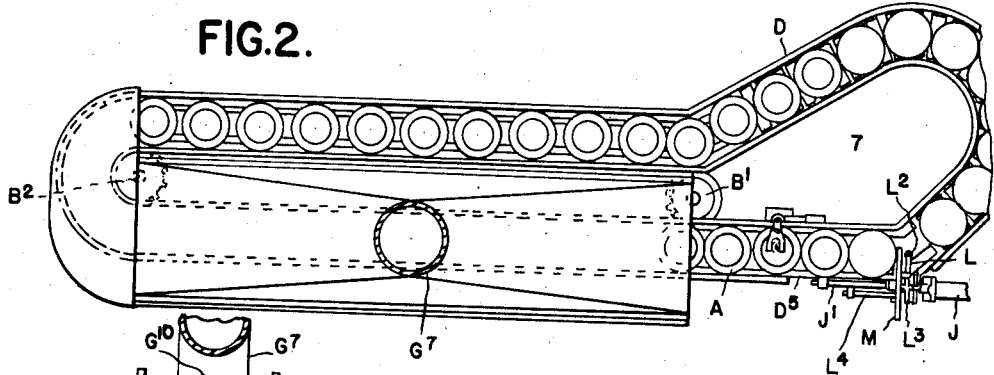
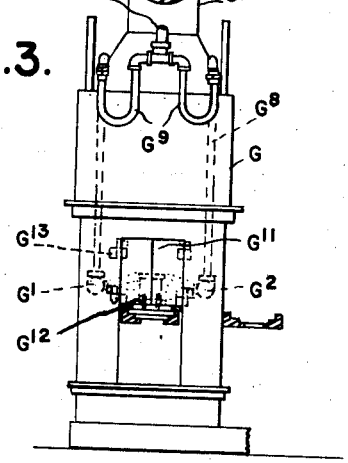
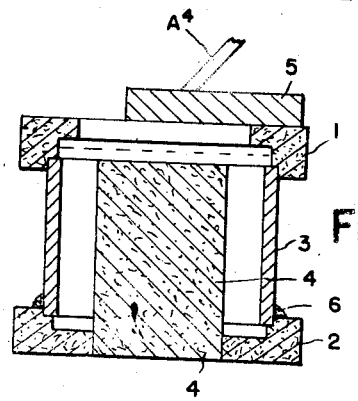
INVENTORS
WINFIELD S. ENDERICH
CHARLES E. EGGENSCHWILER
BY
Whittemore Hulbert + Belknap
ATTORNEYS

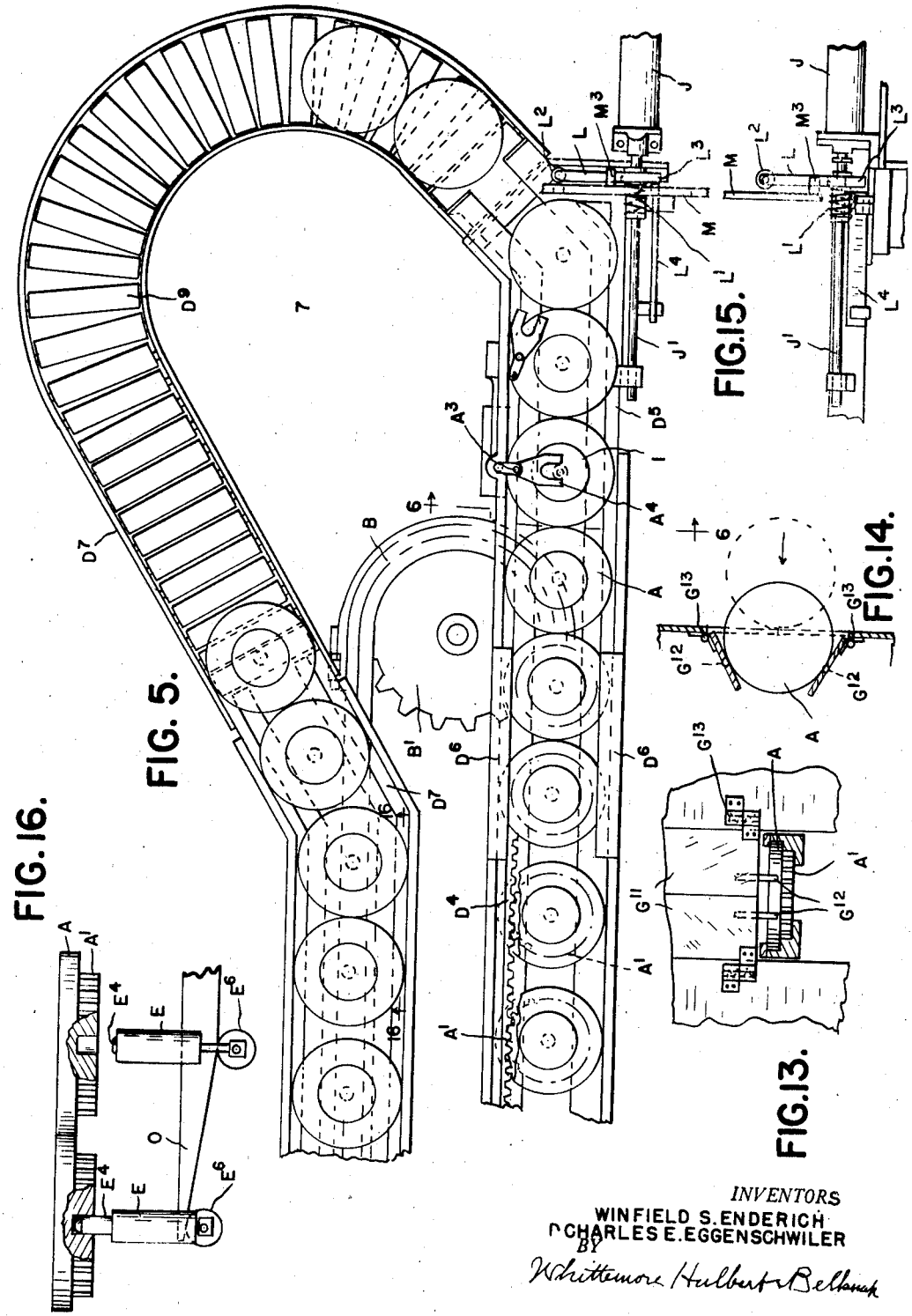

June 29, 1943.  W. S. ENDERICH ET AL  2,322,795
APPARATUS FOR FORMING BEARINGS
Filed March 2, 1942  5 Sheets-Sheet 3

INVENTORS
WINFIELD S. ENDERICH
CHARLES E. EGGENSCHWILER
BY Whittemore Hulbert + Belknap
ATTORNEYS INVENTORS
WINFIELD S. ENDERICH
CHARLES E. EGGENSCHWILER
BY
Whittemore Hulbert Belknap
ATTORNEYS

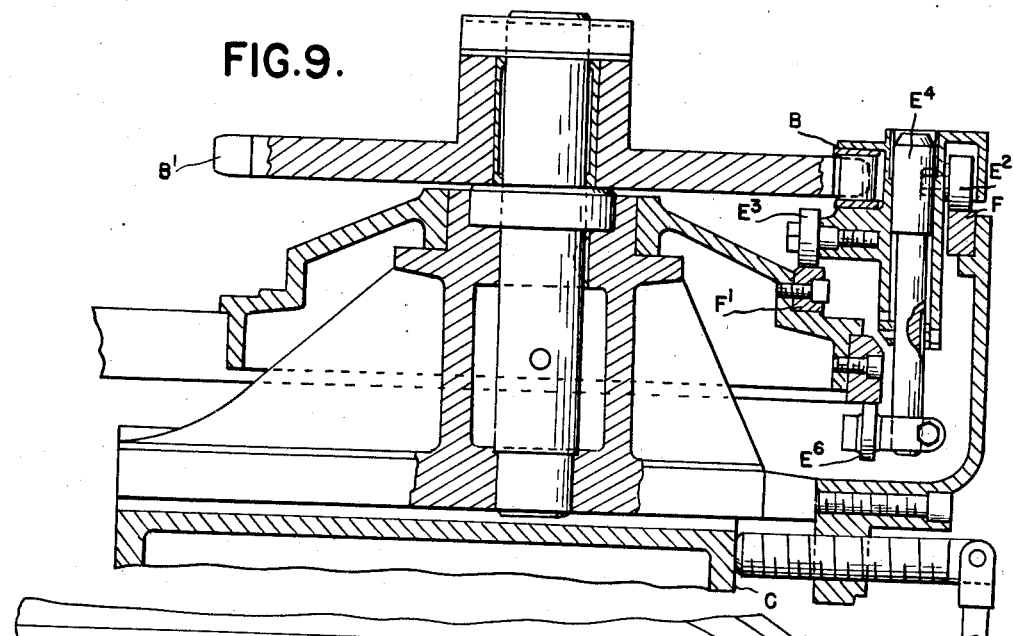
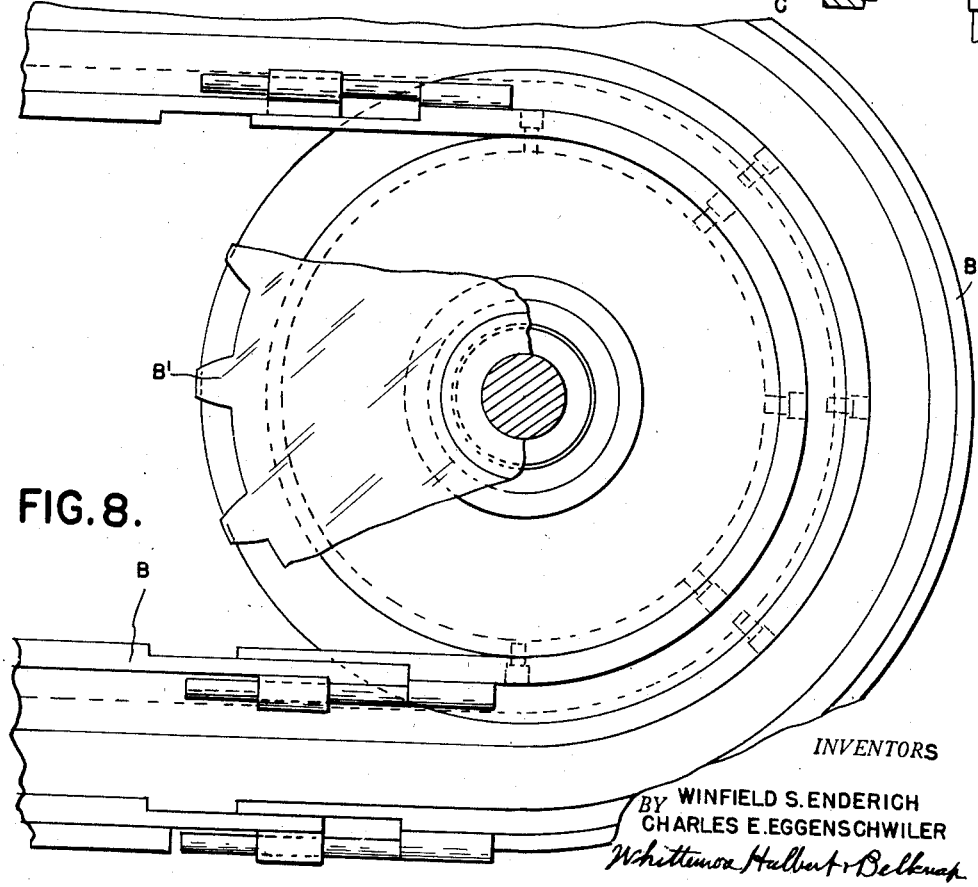

Patented June 29, 1943

2,322,795

UNITED STATES PATENT OFFICE 2,322,795

APPARATUS FOR FORMING BEARINGS

Winfield S. Enderich and Charles E. Eggenschwiler, Detroit, Mich., assignors to Bohn Aluminum & Brass Corporation, Detroit, Mich., a corporation of Michigan Application March 2, 1942, Serial No. 433,094

9 Claims. (Cl. 22—76)

The invention relates to the manufacture of bearings of that type in which the bearing metal is cast upon a preheated reinforcing shell and then rapidly cooled.

It is the primary object of the invention to obtain a construction of apparatus adapted for quantity production of bearings of this type and which expedites the manufacture thereof. To this end the invention consists in the construction as hereinafter set forth and illustrated in the accompanying drawings in which:

Fig. 1 is an elevation, partly in section, of our apparatus;

Fig. 2 is a plan view thereof;

Fig. 3 is an end elevation;

Fig. 4 is a vertical central section through one form of mold which may be used in forming the bearings;

Fig. 5 is a plan view of a portion of the conveyor showing the work holders and a portion of the conveyor therefor;

Fig. 8 is a plan view showing the idler sprocket of the conveyor and the means for taking up the slack in the conveyor chain;

Fig. 9 is a vertical central section through Fig. 8;

Fig. 13 is a view of the swinging doors shown in Fig. 3, but viewed from inside the casing;

Fig. 14 is a plan view thereof showing the doors in open position;

Fig. 15 is a side elevation of the fluid actuated motor and connecting mechanism for advancing the series of molds; and Fig. 16 is an elevation of the means for uncoupling the mold holder from the carrier, viewed substantially from line 16, Fig. 5.

Figure 11:
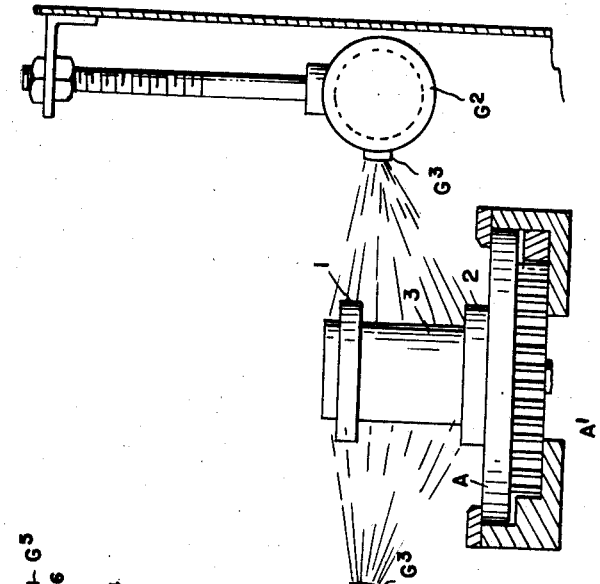
Fig. 11 is a cross section on line 11—11, Fig. 1.
Figure 12:
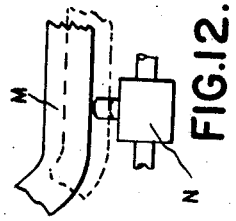
Fig. 12 is an elevation of the control lever in position for actuating the valve for the fluid motor.

In the manufacture of bearings of the type above referred to, the supporting shells, usually formed of steel, are first assembled with molds and then preheated to the proper temperature, such for instance, as 2000° F. The molten bearing metal heated to a still higher temperature is then cast in the mold to contact with the surface of the shell and to become welded thereto. It has been found that with certain bearing metals, the physical characteristics are greatly improved by rapid cooling, particularly where the heat is dissipated outward through the shell. It is therefore usual to treat the cast bearings individually in a separate cooling apparatus.

To expedite the manufacture of such bearings, we have devised an apparatus in which the molds, as soon as the molten metal is poured therein, are automatically transferred to and carried through the cooling means. We have further devised a construction having a plurality of individual mold holders, each provided with means for clamping a mold thereon, together with means for successively advancing these holders into a position where a mold is placed thereon and clamped, the molten metal poured therein, and where finally the holder is engaged with a carrier which conveys it through the cooling apparatus. After passing through the cooler, the holders are returned into proximity to the starting point, where the cooled molds are disengaged therefrom, and the holders are available for repeating the operation.

The mold

The mold in which the bearing is cast may be of any suitable construction, but, as specifically shown, is one formed of graphite. It consists of heads 1 and 2 arranged at opposite ends of the steel shell 3, a core member 4 within the shell, and a cover 5. The core 4 is formed as a press fit in a central recess of the bottom head 2 and extends upward to the height of the shell. The top head 1 is annular, leaving an opening for the pouring into the mold of the mold metal, and the cover 5 closes this opening after pouring. The heads 1 and 2 are also preferably formed so as to permit the molten metal to pass around the ends of the shell as well as adjacent to the inner surface thereof. Leakage of the molten metal is prevented by cementing around the shell and the lower head, as indicated at 6.

Work holders

The work holders are preferably in the form of circular plates A which are of a diameter adapted to receive thereon a mold for a bearing of maximum size. Each plate has a gear wheel A' of smaller diameter depending from the under side thereof and concentric therewith. It is further provided with clamping means which, as shown, comprises a hollow post $A^2$, extending upward from the plate, and a rod $A^3$ slidable within said post. A clamping finger $A^4$ is secured to the rod $A^3$ and extends radially inward therefrom, to bear upon the cover of the mold. Surrounding the rod and within the hollow post is a coil spring $A^5$, the lower end of which engages a collar $A^6$ on the rod, while the upper end abuts against an annular shoulder $A^7$ on the post. Thus, the tension of the spring resiliently draws the rod $A^3$ and finger $A^4$ downward to clamp the work upon the plate.

*Work carrier*

The work carrier comprises a traveling chain B passing about sprockets $B'$ and $B^2$ which are mounted at opposite ends of a supporting frame C. On this frame is mounted a track which extends substantially parallel to the chain and comprises a pair of guide rails D and $D'$, spaced to receive the work holders A therebetween. Each rail has a horizontally extending portion $D^2$ underlapping the work holders A and a vertically extending portion $D^3$ adjacent to the peripheries thereof. The work holders are detachably coupled to the chain through the medium of drag links E and carriages $E'$ connected to these links. Each carriage $E'$ has supporting rolls which travel over tracks on the frame. As shown, there are two rolls $E^2$ engaging a track F on the outer side of the chain, one of these rolls being in advance of the other, while a third roll $E^3$ engages a track $F'$ on the inner side of the chain. Each carriage also has a bearing for a vertically movable coupler pin $E^4$ which is adapted to engage a central recess $A^8$ in the work holder and to form a pivot on which said holder may revolve. The coupler pin is resiliently pressed upward by a coil spring $E^5$ surrounding the same and located within a recess in the carriage. The pin is also actuated through the medium of a roller $E^6$ mounted on the lower end thereof and adapted to engage cam tracks which raise or lower the same, as will be hereinafter described. Thus assuming that the coupler pin $E^4$ is in registration with the recess $A^8$ in a work holder and is moved upward into engagement therewith either by the actuation of the spring $E^5$ or by a cam, it will carry the holder around with the chain while at the same time permitting revolution thereof about its own axis.

*Cooling means*

The cooling means comprises a casing G which extends longitudinally along one side of the chain embracing the same and forming a tunnel through which the work holders are passed. Within this casing are water manifolds $G'$, $G^2$, arranged upon opposite sides of the work holders and provided with a series of spray nozzles $G^3$ directed toward the work on the holders. The manifolds $G'$, $G^2$ are supported by vertically adjustable threaded rods $G^4$ so that the position of the nozzles may be adjusted to suit the particular character of the work. These hanger rods pass through brackets $G^5$ on the casing and are adjusted by nuts $G^6$. The casing G also extends upward above the manifolds and has a stack connection $G^7$ for the escape of steam or vapor. Water is supplied to the manifolds through conduits $G^8$ arising therefrom and which are connected by the flexible hose $G^9$ with the supply conduit $G^{10}$. This permits adjustment of the position of the manifolds without affecting the water supply. At opposite ends of the casing G are hinged doors $G^{11}$. These doors are provided with depending pins $G^{12}$ which are engaged by each of the work holders A to open the doors in advance of the entrance of the work into the casing and to permit them to be automatically closed by spring hinges $G^{13}$. In the same manner, at the opposite end of the casing the work holders passing out therefrom will swing the doors outward to permit the passage of the work and will then automatically close. The casing G is preferably provided with slide doors $G^{14}$ in a side thereof, which permit access to the interior.

In order that the bearings may be uniformly cooled on all portions of the outer shell, the work holders A are revolved during the passage of the same through the casing G. This is effected by a rack bar $D^4$ which is mounted on the rail $D'$ to engage the pinions $A'$ during travel through the casing G. Thus, the molds which are clamped on the plates A will be revolved at the same time that they are sprayed with water from the nozzles on the manifolds $G'$, $G^2$.

*Loading means*

When the highly heated molds are removed from the furnace and are to be filled with the molten metal, they must be placed in a position convenient for the attendant workman. It is also necessary that they should remain stationary while this work is being performed. To provide for this, the rails D and $D'$ are extended beyond the casing G and the sprocket $B^2$ of the work carrier to form a stationary support $D^5$ for a plurality of work holders A while at rest. The workman may then successively remove molds from the furnace and place them on the stationary work holders. Another workman attends to the clamping of the molds on their holders, this being preferably accomplished in the position 7 (Figs. 1 and 2). Here there is located a vertically extending push rod H, with which the rod $A^3$ of the clamping means may be registered, and a pedal $H'$ is used to raise the rod H, thereby lifting the rod $A^3$ and clamping finger $A^4$. The mold is placed beneath the clamping finger, and the pedal is then released to permit the spring $A^5$ to move the finger $A^4$ downward and clamp the mold. The molten metal is poured into the mold while the cover 5 is slid back, and the mold is filled to the height indicated by the dotted line (Fig. 4), which is slightly above the upper end of the shell 3. The cover 5 is then adjusted to close the top of the mold, which is now ready for the cooling operation.

*Cooling operation*

The holder with the filled mold clamped thereon must first be moved to a position where one of the coupler pins $E^4$ is moved upward into engagement with the recess $A^8$ in the holder. This position is determined by the location of a cam I in a track $I'$ which is travelingly engaged by the roller $E^6$ of the coupler pin $E^4$. The roller travels in contact with the surface of this track which holds the pin in a depressed position until it reaches the upwardly inclined cam I which permits it to rise under the resilient pressure of the spring $E^5$. Consequently, if a work holder A is moved to a position above the cam, it will be coupled to the chain B and will continue to travel therewith. This will carry the mold through the length of the casing G, where it is subjected to the water spray from nozzles on the manifolds $G'$, $G^2$, resulting in cooling to the proper temperature before the holder passes out from the casing G. Inasmuch, however, as the work holders on the track extension $D^5$ are stationary, means must be provided for periodically advancing them so that the end holder will be registered with the cam, as just described. For this purpose, there is preferably provided an air cylinder J mounted on the frame adjacent to the track portion $D^5$ and having a piston rod J' extending outward therefrom. This piston rod extends parallel to the track, and its length of stroke is sufficient to advance the series of work holders on the track $D^5$ substantially equal to the diameter of one holder. Thus, the foremost work holder, which has a filled and clamped mold thereon, will be moved into the casing G past the swinging doors $G^{11}$ and to the position for coupling engagement with the pin $E^4$ of one of the carriages E'. In case the registration of the pin $E^4$ with the recess $E^8$ is not exact, a tapered end portion of the pin will cam the holder into alignement. This operation is insured by a cam K engaging the under side of the roller $E^6$ to force it upward, supplementing the action of the spring $E^5$. The holder is prevented from lifting off of the rails D and D' by overlapping top flanges $D^6$ on said rails, and to preclude any danger of breaking of the parts in case a holder should be out of registration with the coupler pin, the cam K is resiliently yieldable. Thus, as shown, the cam K has a depending shank K' passing through bearings in a supporting bracket $K^2$. Surrounding this shank is a spring $K^3$, which is of greater tension than the spring $E^5$, having its upper end engaging a shoulder on the shank and its lower end abutting against the bracket. The tension of the spring $K^3$ is greater than that of the spring $E^5$ and is sufficient to normally force the coupler pin $E^4$ into engagement with the work holder.

Figure 6:
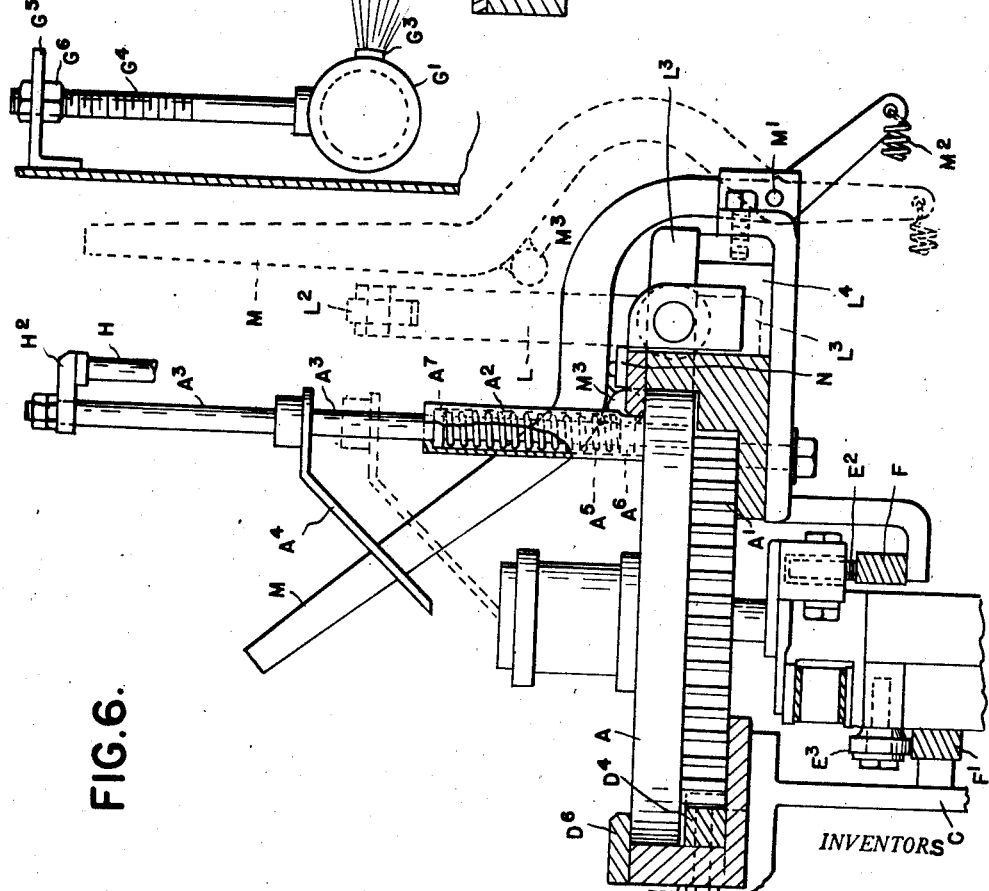
Fig. 6 is a section on line 6—6 of Fig. 5, illustrating the means for engaging the work holders with the conveyor.
Figure 7:
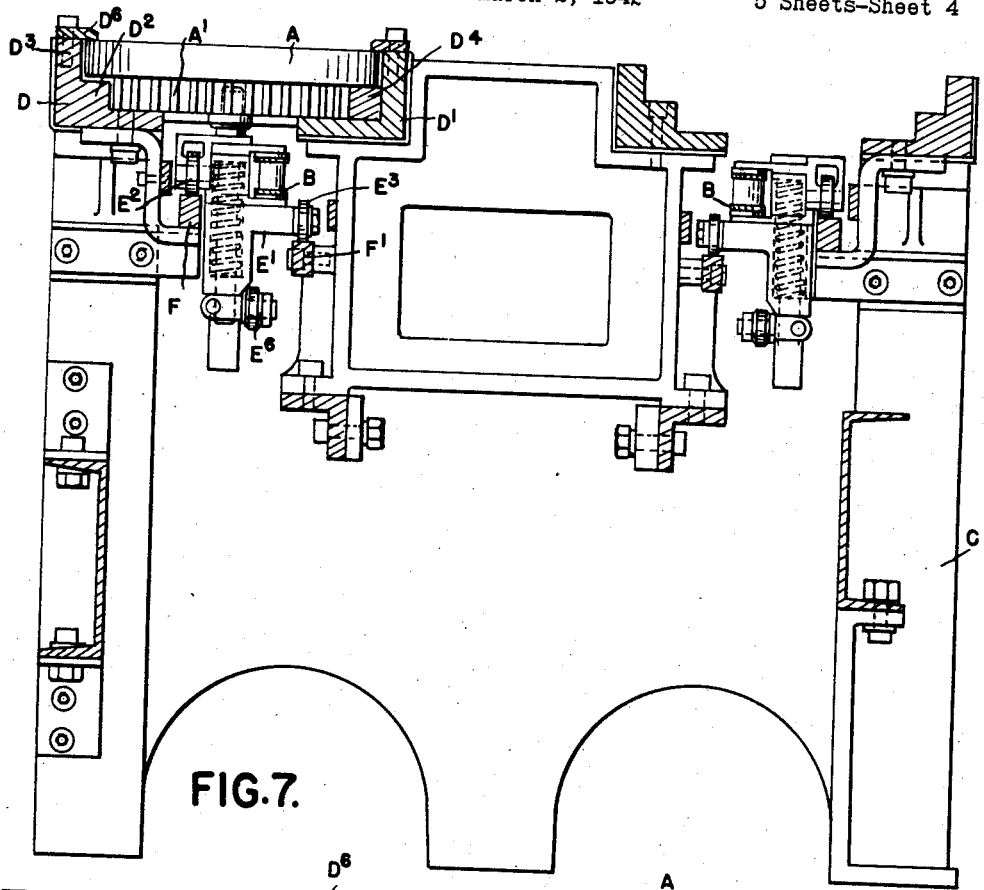
Fig. 7 is a cross section through the frame of the machine.
Figure 10:
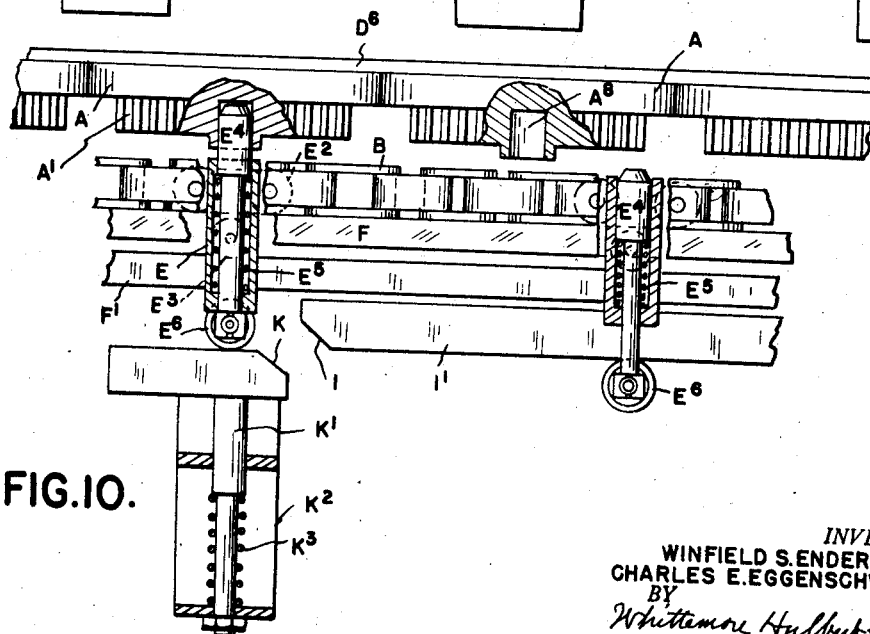
Fig. 10 is a side elevation showing the means for automatically coupling the work holders with the conveyor.

The operation of periodically advancing the work holders on the track $D^5$ is manually controlled through the medium of the following mechanism. Connected to the piston rod J' to travel therewith is an arm L which is capable of swinging from a vertical to a horizontal position, but is normally held in its vertical position by a torsion spring L'. M is a lever adjacent to the arm L in the normal retracted position of the rod J'. This lever is fulcrumed at M' and normally extends vertically, being yieldably held in this position by a spring $M^2$. A finger $M^3$ on the lever bears against the arm L so that by movement of the lever from the position shown in full lines to the position shown in dotted lines (Fig. 6), the arm L will be swung from its vertical to its horizontal position. At the outer end of the arm L is a roller $L^2$ which, when the arm is in its horizontal position, is adjacent to the center of the rearmost work holder on the track $D^5$. Thus, if the air cylinder is energized to move the piston rod J' forward, the arm L and roller $L^2$ will push forward the whole series of work holders on the track $D^5$. The arm L has an oppositely projecting finger $L^3$ which, during the initial movement of the rod J', will travel over a rail $L^4$. This rail will hold the arm L from being swung upward by the tension of the spring L' until it has traveled the full stroke of the rod, at which point the finger $L^3$ disengages from the rail $L^4$, permitting the arm L to swing to vertical position. Thus, during the return movement of the piston rod J', the arm L passes through a different path from that of the work holders. The operation of the lever M also preferably operates a valve N which controls the air to the cylinder J to actuate the piston thereof.

Storage of work holders

After each work holder has been coupled to the carrier, it will travel therewith through the casing G, around the sprocket B, and through the greater part of the return run of the chain. Before completing this run, the coupler pin $E^4$ is disengaged from the holder by a cam O. There is also located at this point a curve $D^7$ in the track, which deflects the holder on to a storage track $D^8$. The holders, when uncoupled by withdrawal of the pins $E^4$, will still be propelled by the oncoming coupled holders so as to be advanced along the storage track $D^8$. This track curves around to a point adjacent to the track $D^5$ and is preferably provided with a series of rollers $D^9$, forming an antifriction support for the holders.

Complete operation

As previously stated, the machine is controlled by an operator who preferably stands in the well between the portion $D^5$, on which the holders are loaded, and the curved storage track $D^8$. In this position he can control the lever N and also the pedal H'. Whenever a heated mold is placed on one of the holders A and is filled with the molten metal (these operations being performed by other workmen), the control operator first clamps the mold on the holder. This he accomplishes by turning the holder A so that a projecting finger $H^2$ at the upper end of the rod $A^3$ registers with the upper end of the rod H. By then depressing the pedal H', the rods H and $A^3$ are lifted so that the clamping finger $A^4$ may be turned above the top of the mold. The pedal is then released, and the tension of the spring $A^5$ will draw down the finger $A^4$ into engagement with the mold. The operator next manipulates the lever M which, as previously described, engages the arm L and turns it down from a vertical to a horizontal position, thereby placing the roller $L^2$ at the end of said arm in rear of one of the holders A on the support $D^5$. Just before the completion of the movement of the lever M, it will engage the valve N, which is opened to supply air to the cylinder J. The piston in this cylinder is thus actuated to move the piston rod J' rearward, carrying with it the arm L and advancing the series of holders A on the track extension $D^5$. The foremost holder of this series, with the filled mold thereon, will be moved by the swinging doors $G^{11}$ into the chamber within the casing G. Here it will be located so that one of the coupling pins $E^4$ of a carriage E', advancing with the chain B, will be raised by the cam K to engage the recess $A^8$ in the holder. It will then travel with the chain through the cooling spray, returning outside the casing G to the point where it is uncoupled by operation of the cam O. The successive holders will be stored on the track $D^7$, where the molds will be removed, as previously explained.

What we claim as our invention is:

1. The combination of a plurality of work holders, a traveling carrier, coupling means for said holders on said carrier, a stand on which one or more work holders rest during the loading of work thereon, means for successively advancing said holders from said stand into operative relation to a coupling means on said carrier, means for automatically operating said coupling means to couple said holders to said carrier when in said relation, and means for rapidly cooling the work on said holders during travel thereof with said carrier.

2. The combination of a plurality of work holders, a traveling carrier, a stand on which one or more work holders rest during the loading of work thereon, means for successively advancing said holders from said stand into operative relation to said carrier, means for automatically coupling said holders to said carrier when in said relation, means for rapidly cooling the work on said holders during travel thereof with said carrier, and means for automatically uncoupling said holders from said carrier at the completion of said cooling operation.

3. The combination of a plurality of work holders, an endless traveling carrier, a stand on which one or more work holders rest during the loading of work thereon, means for successively advancing said holders from said stand into operative relation to said carrier, means for automatically coupling said holders to said carrier when in said relation, means for rapidly cooling the work during its travel on said carrier through a portion of the cycle thereof, means for automatically uncoupling the work from the carrier at the completion of this portion of the cycle, and a storage track for receiving the uncoupled holders on which they are advanced by the push of succeeding coupled holders.

4. The combination of a plurality of rotary work holders, a traveling carrier, a stand on which one or more work holders rest during the loading of work thereon, means for successively advancing said holders from said stand into operative relation to said carrier, spaced coupler pivot pins on said carrier, means for automatically engaging said pins with said work holders when in said operative relation, means for rotating the work on said coupler pivot pins during travel with the carrier, means for rapidly cooling the work on said holders during travel thereof with said carrier, and means for automatically withdrawing said coupler pins from their holders at a predetermined point in the cycle.

5. The combination of a plurality of mold holders, an endless traveling carrier, a track for said mold holders having a portion parallel to the path of said carrier and a portion diverging from said path including a portion forming a stand on which said holders rest during the placement of heated molds thereon and the pouring of molten metal into said molds, means for successively advancing on said track the holders having the filled molds thereon from said stand portion to a predetermined position on said parallel portion, automatic means for coupling said carrier to said holders when in the latter position, means for rapidly cooling the molds while traveling with said carrier, and means for uncoupling said holders from said carrier in advance of the diverging portion of said track, whereby they will be pushed on to said diverging portion by the succeeding coupled holders.

6. The combination with a plurality of holders for receiving heated bearing molds, a track over which said holders travel, a carrier for moving said holders along said track, a casing enclosing a portion of said track, spraying means within said casing comprising manifolds arranged on opposite sides of said track, inwardly directed nozzles on said manifolds and hangers for said manifolds vertically adjustable within said casing to raise or lower said nozzle so as to properly direct the spray toward said molds.

7. The combination of a traveling endless carrier chain, spaced carriages connected to said chain, a track over which said carriages travel, a plurality of rotary work holders, each adapted to receive a heated mold, a track over which said work holders travel having a portion parallel to the track for said carriages and a portion divergent therefrom, a coupler pin mounted on each carriage adapted to pivotally engage a work holder in registration therewith, means for successively advancing the holders from the divergent portion of the track therefor to a predetermined position in the portion parallel to the track for said carriages, means raising the coupler pin on each carriage at said predetermined point to pivotally couple the registering work holder therewith, means for rotating the work holders on their pivots, cooling spray means directed against the molds during their advancement and rotation with said holders, and means for disengaging said coupler pins in advance of the point of divergence of the track for the holders.

8. The combination of a plurality of work holders for receiving heated molds, each comprising a circular plate and a gear wheel of smaller diameter depending therefrom and concentric therewith, a track over which said work holders travel comprising spaced rails for engaging the peripheral portions of said circular plates, a rack bar extending parallel to one of said rails to engage said gear wheels to rotate the same and their attached plates during travel along said rails, a carrier for advancing said holders along said track, and cooling means for the molds on said holders during travel and rotation of the same.

9. The combination of a plurality of mold holders, an endless traveling carrier, a track for said mold holders having a portion parallel to the path of said carrier and a portion diverging from said path including a portion forming a stand on which said holders rest during the placement of heated molds thereon and the pouring of molten metal into said molds, means for automatically coupling said mold holders to said carrier, means for rapidly cooling the molds on said holders while traveling with said carrier, and means for successively advancing said mold holders on said stand into position for automatic coupling to said carrier, said means comprising a reciprocatory fluid actuated motor adjacent to said stand, an arm pivotally engaging the reciprocating member of said motor, resilient means for normally holding said arm in upright position, a lever engageable with said arm to swing the same into a horizontal plane in rear of a holder on said stand, and a valve for supplying fluid to said motor adapted to be actuated by said lever as said arm is swung to its horizontal position.

WINFIELD S. ENDERICH.
CHARLES E. EGGENSCHWILER.